Nov. 5, 1957  V. G. BOGER  2,812,278
METHOD OF BONDING A BASE MATERIAL TO A RUBBER LAYER USING
RUBBERY ADHESIVES AND ARTICLES MADE THEREBY
Filed Aug. 30, 1954
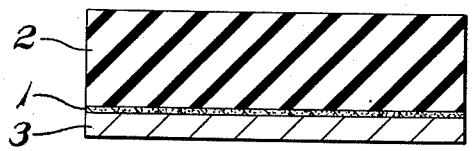
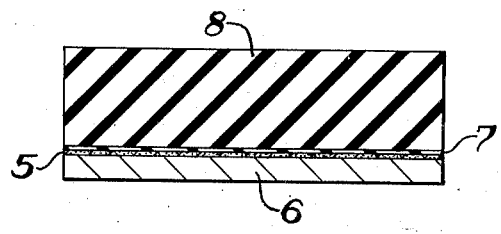
INVENTOR.
VERNON G. BOGER
BY
ATTY.

United States Patent Office 2,812,278
Patented Nov. 5, 1957

2,812,278

METHOD OF BONDING A BASE MATERIAL TO A RUBBER LAYER USING RUBBERY ADHESIVES AND ARTICLES MADE THEREBY

Vernon G. Boger, Akron, Ohio, assignor to The B. F. Goodrich Company, New York, N. Y., a corporation of New York Application August 30, 1954, Serial No. 453,083

16 Claims. (Cl. 154—130)

This invention relates to rubbery adhesive compositions, to articles of manufacture employing such adhesives, and to methods of making the same. More particularly, the present invention relates to halogenated rubbery compositions useful in bonding rubber to metal, to articles of manufacture containing such compositions and to methods of making the same.

Many parts of automobiles including especially the motor are insulated from the frame or chassis against vibration by means of rubber bushings, mountings or suspensions. One side of the rubber mounting is secured by an adhesive to a bracket mounted on the chassis while the other side is likewise secured with adhesives to another bracket or other means on the motor. While the rubbery chloroprene polymers or rubbery copolymers of butadiene and acrylonitrile are eminently suitable for use in such places as they resist deterioration due to grease and oil, these polymers are not as resilient as the natural rubber or isoprene type polymers or the rubbery butadiene-styrene copolymers and, accordingly, do not afford the desired degree of insulation. Although the latter type of polymers are not as oil resistant as the former type of polymers, they need only be replaced after years of service since the oil contamination is a minor factor in present day cars and their vibration dampening or insulating qualities outweigh to a very large extent any deficiency they may exhibit as to oil deterioration. On the other hand the adhesives or cements employed with the oil-resistant polymers do not provide the requisite bond needed between the mounting and the metal bracket for the engine when natural and the butadiene-styrene rubbers are used. Hence, it is a primary object of the present invention to provide a new composition of matter useful as an adhesive for securing base materials to rubber.

It is another object of this invention to provide an adhesive composition useful in securing metal to rubbery polymers such as natural rubber and the rubbery butadiene-styrene copolymers.

Still another object of this invention is to provide a novel article of manufacture comprising a base material and the adhesive of the present invention.

Yet another object is to provide a novel article of manufacture comprising a metal base bonded to natural rubber or rubbery butadiene-styrene copolymers by the novel adhesive herein disclosed.

A further object is to provide a method for making adhesives of high effectiveness in securing base materials to rubbers.

A still further object is to provide a method for securing rubbers, in particular natural and butadiene-styrene type rubbers, to base materials such as metal.

These and other objects and advantages of the present invention will become more apparent to those skilled in the art from the following detailed description, examples and drawing in which:

Fig. 1 is a vertical sectional view of a representative article of manufacture employing the adhesive composition of the present invention, and Fig. 2 is a vertical sectional view of a modification of the device shown in Fig. 1.

It has now been discovered according to the present invention that a highly effective adhesive for securing rubbery polymers to base materials and, in particular, for securing natural rubber and butadiene-styrene rubbers to metal is obtained by using a composition comprising, as essential adhesive ingredients dissolved in a volatile organic solvent, from about 75 to 92.5% by weight of a rubbery diene hydrocarbon homopolymer and the balance a rubbery copolymer comprising a monomer of an open-chain conjugated diene hydrocarbon having from 4 to 8 carbon atoms and a monomer selected from the group consisting of styrene and its alkyl and halogen substituted derivatives, said homopolymer having been substantially completely halogenated with and said copolymer having been from about 7½ to 30% by weight halogenated with active halogen selected from the group consisting of chlorine and mixtures of chlorine and up to about 10% by weight of bromine and the active halogen atoms from the halogenation of said copolymer being substantially evenly distributed throughout the molecular chain of said copolymer. The adhesive composition disclosed herein is stable over long periods of time and provides a strong bond between metal bases and rubbers and is of especial use in securing rubber mountings of natural and butadiene-styrene copolymers to metal bracket members to insulate an engine from the chassis. It may be easily applied by conventional methods of using adhesives and does not require extensive or special treatment of the base other than that generally required prior to application of adhesives.

The rubbery hydrocarbon polymer which is substantially completely halogenated is a rubbery diene hydrocarbon homopolymer such as natural rubber, caoutchouc and the like which is essentially a polymer of isoprene, gutta percha and balata, or synthetic rubbery hydrocarbon polymers of open-chain conjugated diene hydrocarbons having from 4 to 8 carbon atoms such as polypiperylene; polybutadiene-1,3; polyisoprene; polymerized 2,3-dimethyl butadiene-1,3; polymerized 1,4-dimethyl butadiene-1,3 and the like and mixtures thereof. It, of course, is apparent that minor amounts of other monomers, such as acrylates, styrene, and the like and mixtures thereof which are compatible with the dienes may be copolymerized with the dienes so long as they do not adversely affect the properties of the dienes. However, the dienes including the natural polymers used are essentially homopolymers, natural rubber being the preferred polymer to use. The rubbery polymer is substantially completely halogenated, that is, it contains from about 55 to 68% by weight of halogen where the theoretical halogen content is above about 68% of the molecule of the chain. It is not desired to go much below about 55% halogenation as poor metal adhesion is obtained. Halogenation is effected by passing halogen gas through a solution of the rubbery homopolymer in a volatile organic solvent therefor at a temperature to give a soluble derivative (about 80–110° C.). After the desired degree of halogenation has been achieved, the halogen gas is shut off. The derivative is then isolated from the solution by precipitation with alcohol or by distilling off the solvent. It is believed that substitution predominates during the early stages of the halogenation reaction with addition predominating during the later stages. The halogen employed should be an active halogen which will furnish halogen to affect the adhesive character of the material when combined with the metal and rubber mounting and/or during subsequent vulcanization. Chlorine has been found eminently useful for this purpose but mixtures of chlorine and up to about 10% by weight of bromine may likewise be used successfully in the practice of the present invention. However, above about 10% by weight of bromine, the adhesive tends to become brittle so that above about 10% bromine is not desired where flexibility is indicated. On the other hand while fluorine and iodine are generally considered reactive in the free state, it would appear that when combined by substitution and/or addition with such homopolymer molecule they lose their reactivity and the homopolymers tend to become inert and fail to function as adhesives. Hence, these halogens should not be employed. Moreover, while halogen is preferably passed through the homopolymer dispersed or dissolved in the volatile organic solvent, halogenation may also be effected by passing chlorine gas through a strongly acid aqueous dispersion or latex of the homopolymer, coagulating, drying and then dissolving the halogenated homopolymer in a volatile organic solvent. Still another method is to react the rubbery homopolymer under pressure with the halogen gas followed by dissolution in a volatile organic solvent.

The rubbery copolymer which is halogenated to the extent of from about 7½ to 30% by weight is a copolymer of a monomer of an open-chain conjugated diene hydrocarbon having from 4 to 8 carbon atoms such as butadiene-1,3; isoprene; piperylene; 2,3-dimethyl butadiene-1,3; 1,4-dimethyl butadiene-1,3, and the like and mixtures thereof with a monomer selected from the group consisting of styrene and its alkyl and halogen substituted derivatives such as styrene itself, alpha methyl styrene, alpha chloro styrene, and the like and mixtures thereof. Minor amounts of other monomers copolymerizable with the hydrocarbon diene and styrene monomers may also be present such as methyl, acrylate, ethyl acrylate, etc. However, monomers such as acrylonitrile and vinyl pyridine will not provide a satisfactory bond from the rubber to the adhesive layer and, thus, should be avoided generally. The rubbery copolymer generally contains at least 50% by weight of the conjugated diene and preferably from about 55 to 85% by weight of the diene. Halogenation of the rubbery copolymer with active halogen is carried out in the same manner as described above with respect to halogenation of the rubbery homopolymer and the preferred method is to halogenate a solution of the rubbery copolymer in a volatile organic solvent. Moreover, halogenation should be effected under conditions of agitation and especially high agitation to substantially evenly distribute the halogen atoms throughout the chain of molecules of the copolymer to avoid the formation in one place or various places of large amounts of chlorine. It has been found that when little or no agitation is employed during the halogenation process, the bond or tensile strength of the resulting adhesive is too poor to be useful. Furthermore, halogenation should proceed until only from about 7½ to 30% by weight of halogen atoms are introduced into the rubbery copolymer. Preferably, halogenation should be from about 12½ to 17½% by weight to afford the best adhesion. Too high or too a low degree of halogenation does not result in a composition which, when combined with the substantially completely halogenated homopolymer, will satisfactorily secure metal to rubbers such as natural rubber and the rubbery butadiene-styrene copolymers. During the halogenation of the rubbery copolymer it is believed that a larger proportion of substitution occurs than addition although the mechanism occurring and the position of the halogen atoms is not precisely known. In any event it has been found that limited halogenation and an even distribution of active halogen atoms on the copolymer molecule, probably afforded by high agitation, are mainly responsible for the excellent bond between the adhesive and rubbers such as natural rubber and the butadiene-styrene rubbers.

The substantially completely halogenated rubbery homopolymer and the 7½ to 30% halogenated rubbery copolymer are compatible with each other and are used in an amount of from about 75 to 92.5% by weight of said homopolymer to from about 25 to 7.5% by weight of said copolymer, on a dry weight basis. The best results are obtained with from about 80 to 88% by weight of said homopolymer to from 20 to 12% by weight of said copolymer. Outside of these limits insufficient bonding between the metal and the rubber mounting is obtained.

Appropriate compounding ingredients such as fillers, extenders, reinforcing agents, colors, and antioxidants, may also be employed with the halogenated homo- and copolymers. Examples thereof are zinc oxide, carbon black, silica, phenyl beta naphthylamine, styrenated phenols, and iron oxide. Chelating agents or stabilizers such as epichlorohydrin, isopropyl alcohol, lead carbonate are very desirably added to the adhesive composition of this invention. A minor amount of natural rubber up to 10% by weight may also be added as a plasticizer. While not always necessary, a vulcanizing agent such as sulfur can likewise be employed although it is possible to obtain a cure, that is, a resulting nonplastic state in the adhesive, without the use of specially added curing agents. Possibly, the curing agent migrates from the rubber mounting or the adhesive is cured by means of some reaction of the active halogens in the homopolymer and copolymer during the cure so that the adhesive composition effectively bonds the rubber to the metal.

Volatile organic solvents employed in practice of the present invention are any of the solvents customarily employed with the rubber hydrocarbon homopolymers and copolymers described above. Examples of solvents found useful are benzene, toluene, xylene, cymene, chloroform, carbon tetrachloride and the like as well as mixtures thereof. These solvents or mixtures thereof can contain one or more of the following additional solvents in minor amounts if desired: acetone, ketones, esters such as butyl acetate and the like, alcohols such as methyl and ethyl alcohol and aliphatics such as gasoline. The amount of solvent is not too critical but should be present in an amount sufficient to disperse or dissolve the homopolymer, copolymer and compounding ingredients. Larger amounts can be used depending on the degree of fluidity desired. Therefore, the amount of solvent may vary from about 50 to 500% by weight based on the weight of said homopolymer plus said copolymer. It should be pointed out that the solvent should not be forcibly evaporated from the halogenated homopolymer and partially halogenated copolymer and then reintroduced to the rubbers as such procedure tends to degrade said homopolymer and/or copolymer and reduce their adhesiveness.

In preparing the adhesive composition of the present invention, the homopolymer and copolymer each in the desired amount of solvent are chlorinated separately to the requisite degree as described supra and then mixed together to provide the necessary ratios of homopolymer to copolymer as also described above. The compounding ingredients are added to the dry homo- or copolymer on a rubber mill or in a Banbury prior to dissolution in the solvent to afford the best dispersion in the homo- or copolymer but they can be added to the solution of the homo- or copolymers after they are mixed together.

The base material to be secured to the rubbery material by the adhesive of the present invention is a metal such as steel, aluminum, magnesium, brass, etc. The adhesive of the present invention is also useful in adhering rubbery materials to base materials such as wood, concrete and the like and to plastic materials such as polyvinyl chloride or polyvinylidene chloride, copolymers of the monomers of these vinyls or mixtures of such polymers as well as copolymers of vinyl chloride and vinyl acetate and the like. The surface of the base material does not need to be specially treated prior to applying a coating of the present adhesive other than to remove grease, dirt, loose scale and the like. For example a metal surface need only be degreased and shot blasted to prepare it for reception of the adhesive coating as it is unnecessary to etch or chemically polish the surface. In many instances a degreasing operation alone will be sufficient.

The rubbery materials which are to be adhered to the base materials and particularly metals as disclosed herein are natural rubber, gutta percha, balata and the GR-S type of rubbery copolymers obtained by copolymerizing an open-chain conjugated diene hydrocarbon having from 4 to 8 carbon atoms such as isoprene; butadiene-1,3; piperylene; 2,3-dimethyl butadiene-1,3; 1,4-dimethyl butadiene-1,3 and the like and mixtures thereof with a monomer such as styrene, alpha methyl styrene, alpha chlorostyrene and mixtures thereof and the like. Mixtures of the foregoing natural and synthetic rubbers may also be used. The synthetic copolymers may also contain minor amounts of copolymerizable monomeric materials such as methyl acrylate, ethyl acrylate, etc. Generally, the copolymers contain at least 50% of the diene and preferably from 55 to 85% by weight of the diene. The rubbers should contain vulcanizing agents such as sulfur, or other curing agents. Accelerators, antioxidants, extenders, reinforcing pigments, fillers and colors may also be present as is well known to those skilled in the art. Examples thereof are mercapto benzothiazole, phenyl beta naphthylamine, carbon black, titanium dioxide, zinc oxide and arc silica. Arc silica is a fine, amorphous silicon dioxide obtained by blowing silicon monoxide gas, produced by the reaction of sand and carbon at high temperatures such as in an arc furnace, with an oxidizing gas.

In applying the adhesive composition of the present invention to secure rubbery materials to base materials such as metal, the surface of the metal is cleaned and the adhesive coated thereon by any one of several methods such as by spraying, roller coating, dipping, brushing, spreading and the like and allowed to stand for awhile to permit evaporation of the solvent. The adhesive coating may vary from about 5/10,000 to 1/100 inch thick or thicker as required. More than one adhesive coat may be applied. Next, the rubbery vulcanizable material such as natural rubber or a rubbery copolymer of about 75% butadiene-1,3 and the balance styrene is applied and the whole assembly vulcanized at a temperature of from about 270 to 325° F., under pressure if desired, for various periods of time depending on the type of cure required. As shown in Fig. 1, the adhesive layer 1 of the present invention is interposed between the rubbery material 2 and the base material such as metal 3. Alternatively, after the adhesive coat has dried on the metal, a layer of a rubbery natural rubber or GR-S rubber cement containing a vulcanizing agent may be applied to the adhesive coating to cover the same if it is desired to increase the strength of the bond or to wait any appreciable time, such as a few days, before applying the rubbery mounting. Finally, after the second coat has dried, the rubbery natural rubber or GR-S rubber mounting material is applied to it and the whole assembly cured as hereinbefore described. This assembly is shown in Fig. 2 where the adhesive coating 5 of the present invention is applied to a base such as metal 6 and then the adhesive is coated with a layer of natural rubber cement 7 to which the rubbery material 8 is applied.

The adhesive composition of the present invention has excellent shelf life when stored in containers. However, it should not be subjected to heat and the atmosphere for extended periods of time to avoid degradation. Likewise when applied to a base material and dried, the rubbery mounting should be associated with it promptly and cured thereon to avoid atmospheric attack. The adhesive composition of the present invention is flexible for it does not crack when the metal and rubber to which it is bonded are bent. It should be noted that many conventional natural and GR-S rubber compositions bonded to metal by means of the presently disclosed cement composition failed in standard tests before the adhesive bond failed.

The following examples will serve to illustrate the invention with more particularity to those skilled in the art:

*Example I*

Carbon black was milled into a rubbery copolymer of about 75% by weight of butadiene-1,3 and the balance styrene in the ratio of 35 parts black to 100 parts rubber by weight. 182 grams of the mixture were then dissolved or dispersed in about 3365 ml. of toluene and the solution was placed in a flask containing a stirrer and violently agitated. Chlorine gas, about 37½ grams, was passed in the solution at a constant rate for 1 hr. while being violently agitated. The copolymer derivative was about 15.0% by weight halogenated as determined by analysis. After halogenation, air was blown through the mixture to remove HCl and about 0.2% by weight of epichlorohydrin added. 400 ml. of the resulting halogenated copolymer solution or dispersion were then mixed with 100 grams of 68% halogenated natural rubber in 150 ml. toluene, 150 ml. xylene and 2 grams of oil soluble black dye. After all of the components were thoroughly mixed together, portions of the adhesive were brushed onto a steel button which had been degreased, shot blasted and degreased to provide an adhesive coating about 1/1000 inch thick on drying. On drying or evaporation of the solvent, a vulcanizable standard natural rubber stock was placed on the cement and the whole vulcanized according to ASTMD429–47T, method A. Additional samples were prepared in the same manner as well as some in which a rubbery 75–25 butadiene-1,3-styrene copolymer stock was used in place of the natural rubber stock. The times and temperatures of curing and the results obtained on the cured samples when subjected to adhesion tests in an Olson 10,000 lb. testing machine (1″-min.) are indicated below:

| Rubbery Stock | Cure, °F. | Time (Min.) | Load to Failure (Pounds) | Type Failure |
|---|---|---|---|---|
| GR-S | 307 | 30 | 1,480 | Stock. |
| GR-S | 307 | 30 | 1,300 | Do. |
| GR-S | 307 | 30 | 1,573 | Do. |
| GR-S | 307 | 30 | 1,470 | Do. |
| Natural | 280 | 120 | 1,676 | Do. |
| Do | 280 | 120 | 1,826 | Do. |
| Do | 280 | 120 | 1,744 | Do. |
| Do | 280 | 120 | 1,576 | Do. |

The above results show that the stocks which were applied to the adhesives failed before the adhesives did. When neoprene, polychlorobutadiene-1,3, was substituted for the halogenated copolymer in the above adhesive composition, an effective bond between the natural rubber or GR-S rubber stock could not be obtained. Likewise, when the halogenated copolymer was omitted entirely from the adhesive composition described above, no effective bond was obtained between the adhesive and the natural rubber or GR-S stock, whereas when the 68% halogenated natural rubber was omitted no bond between the metal and adhesive was obtained.

*Example II*

The method of this example was the same as Example I, above, except that the natural rubber and GR-S stocks were specially compounded, reinforced and vulcanized to give higher tensile, higher durometer stocks. After vulcanization, tests were conducted and revealed that the adhesive bond to the rubber stocks failed at pulls of from 1,600 to 2,100 pounds. However, when a layer of natural rubber or GR-S cement was applied to the dried adhesive coating, dried and then combined with the tougher stocks and cured, improvements of up to 40% were realized in pounds required to pull the stocks from the adhesive layer on the metal base.

*Example III*

The method of this example was the same as that shown for Example I, above, except that variations were made in the ratio of the 15% halogenated copolymer to the 68% halogenated natural rubber (dry basis) and were adhered to the tough rubbery polymers described in Example II. Pulling tests were conducted on the cured samples and the results are shown below:

| Rubbery Stock | Parts of 15% Halogenated Copolymer | Parts of 68% Halogenated Homopolymer | Load to Failure (Pounds) | Type Failure |
|---|---|---|---|---|
| GR-S | 1 | 99 | 338 | Adhesive. |
| GR-S | 5 | 95 | 800 | Do. |
| GR-S | 7.5 | 92.5 | 1,200 | Do. |
| GR-S | 10 | 90 | 1,820 | Do. |
| GR-S | 20 | 80 | 1,956 | Do. |
| GR-S | 30 | 70 | 895 | Do. |
| Natural | 2 | 98 | 290 | Do. |
| Do | 5 | 95 | 760 | Do. |
| Do | 15 | 85 | 1,630 | Do. |
| Do | 24 | 76 | 1,600 | Do. |
| Do | 29 | 71 | 650 | Do. |

These results show that an adhesive containing below about 7.5% and above about 25% by weight of the partially halogenated copolymer, the balance being the substantially completely halogenated homopolymer, will not provide the desired degree of adhesion. The minimum acceptable pull for such rubber to metal adhesives is about 1,000 pounds.

*Example IV*

The method of this example was the same as Example I, supra, except that, during chlorination of the copolymer, the copolymer solution was stirred slowly or not at all. After curing the adhesive in combination with a metal plate and with the rubber stocks of Example II, tests were conducted and the results are shown below:

| Degree of Stirring | Rubbery Stock | Load to Failure (Pounds) | Type of Failure |
|---|---|---|---|
| None | GR-S | 300 | Adhesive. |
| Slow (Viscous) | GR-S | 395 | Do. |
| High Speed (Turbulent) | GR-S | 1,820 | Do. |
| None | Natural | 450 | Do. |
| Slow (Viscous) | do | 430 | Do. |
| High Speed (Turbulent) | do | 1,710 | Do. |

*Example V*

The method of this example was the same as that of Example I, above, except that the amount of halogenation of the copolymer in the adhesive was varied and the rubber stocks against which the adhesive was cured were those set forth in Example II, above. The results on pulling tests are indicated in the table below:

| Rubbery Stock | Percent by Weight Halogenation of Copolymer | Load to Failure (Pounds) | Type of Failure |
|---|---|---|---|
| GR-S | 5 | 890 | Adhesive. |
| GR-S | 7.5 | 1,000 | Do. |
| GR-S | 16 | 1,670 | Do. |
| GR-S | 25 | 1,100 | Do. |
| GR-S | 30 | 1,000 | Do. |
| GR-S | 35 | 860 | Do. |
| Natural | 8 | 1,100 | Do. |
| Do | 14.5 | 1,800 | Do. |
| Do | 16.5 | 1,850 | Do. |
| Do | 24 | 1,080 | Do. |
| Do | 30 | 1,050 | Do. |

The results indicated above show that outside the range of about 7½ to 30% halogenation of the copolymer satisfactory adhesion is not obtained.

In summary, the present invention teaches that valuable adhesives for securing rubbery materials to base materials, particularly metal, may be obtained by using a composition comprising, in a volatile organic solvent, from about 7.5 to 25% by weight of from about a 7.5 to 30% halogenated rubbery copolymer of an open-chain conjugated diene having from 4 to 8 carbon atoms and a styrene type monomer with from 92.5 to 75% by weight of a substantially completely halogenated rubbery diene hydrocarbon homopolymer. The adhesives of the present invention are particularly effective in securing natural rubbers and GR-S rubbers to metal. Moreover, the adhesive of the present invention is not limited to use with metal as a base material but can also be employed to secure rubber to concrete, wood, vinyl polymers and the like. Furthermore, this adhesive composition can be used in a variety of structures such as motor mounts, torsilastic springs, printing rollers, cutlass bearings, laminated structures, or wherever a strong bond is required.

What is claimed is:

1. An article of manufacture comprising a base and a rubbery vulcanized polymeric material adhered to the surface of said base by means of an interposed laminate comprising a layer of an adhesive disposed on said base and comprising as essential adhesive ingredients from about 75 to 92.5% by weight of a rubbery diene hydrocarbon homopolymer and the balance a rubbery copolymer comprising a monomer of an open-chain conjugated diene hydrocarbon having from 4 to 8 carbon atoms and a monomer selected from the group consisting of styrene and its alkyl and halogen substituted derivatives, said homopolymer having been substantially completely halogenated with and said copolymer having been from about 7.5 to 30% by weight halogenated with active halogen selected from the group consisting of chlorine and mixtures of chlorine and up to about 10% by weight of bromine and the active halogen atoms during the halogenation of said copolymer having been substantially evenly distributed throughout said copolymer by agitation of said copolymer in the presence of said active halogen, and a layer of a cement of a rubbery material selected from the group consisting of natural rubber and butadiene-1,3-styrene copolymer rubber adheringly disposed on said adhesive layer and adjacent said rubbery vulcanized polymeric material.

2. An article of manufacture comprising a metal base and a rubbery vulcanized polymeric material adhered to the surface of said metal base by means of an interposed laminate comprising a layer of an adhesive disposed on said base and comprising as essential adhesive ingredients from about 80 to 88% by weight of a rubbery diene hydrocarbon homopolymer and the balance a rubbery copolymer comprising a monomer of an open-chain conjugated diene hydrocarbon having from 4 to 8 carbon atoms and a monomer selected from the group consisting of styrene and its alkyl and halogen substituted derivatives, said homopolymer having been substantially completely halogenated with and said copolymer having been from about 12.5 to 17.5% by weight halogenated with active halogen selected from the group consisting of chlorine and mixtures of chlorine and up to about 10% by weight of bromine and active halogen atoms during the halogenation of said copolymer having been substantially evenly distributed throughout said copolymer by agitation of said copolymer in the presence of said active halogen, and a layer of a cement of a rubber composition selected from the group consisting of natural rubber and butadiene-1,3-styrene copolymer rubber adheringly disposed on said adhesive layer and adjacent said rubbery vulcanized polymeric material.

3. An article of manufacture according to claim 2 in which said open-chain conjugated diene hydrocarbon in said copolymer of said adhesive is present in an amount of from about 55 to 85% by weight.

4. An article of manufacture according to claim 3 in which said copolymer of said adhesive comprises a copolymer of about 75% by weight of butadiene-1,3 and the balance styrene.

5. An article of manufacture according to claim 3 in which said rubbery vulcanized polymeric material comprises natural rubber.

6. An article of manufacture according to claim 3 in which said rubbery vulcanized polymeric material comprises a copolymer of about 75% by weight of butadiene-1,3 and the balance styrene.

7. An article of manufacture according to claim 3 in which in said cement layer said rubbery composition comprises a copolymer of about 75% by weight of butadiene-1,3 and the balance styrene.

8. The method which comprises coating the surface of a base material with a coating of an adhesive composition comprising as essential adhesive ingredients, in a volatile organic solvent, from about 75 to 92.5% by weight of a rubbery diene hydrocarbon homopolymer and the balance a rubbery copolymer comprising a monomer of an open-chain conjugated diene hydrocarbon having from 4 to 8 carbon atoms and a monomer selected from the group consisting of styrene and its alkyl and halogen substituted derivatives, said homopolymer having been substantially completely halogenated with and said copolymer having been from about 7.5 to 30% by weight halogenated with active halogen selected from the group consisting of chlorine and mixtures of chlorine and up to about 10% by weight of bromine and the active halogen atoms during the halogenation of said copolymer having been substantially evenly distributed throughout said copolymer by agitation of said copolymer in the presence of said active halogen, evaporating said solvent from said composition of said coating, applying a layer of a cement of a rubbery material in a volatile organic solvent and selected from the group consisting of natural rubber and butadiene-1,3-styrene copolymer rubber to said solvent-free adhesive coating, evaporating said solvent from said cement, associating a rubbery unvulcanized vulcanizable polymeric material in adhering relationship with said cement layer to produce a composite assembly and vulcanizing said assembly.

9. The method which comprises coating the surface of a cleaned metal base with a coating of an adhesive composition comprising as essential adhesive ingredients, dissolved in a volatile organic solvent, from about 80 to 88% by weight of a rubbery diene hydrocarbon homopolymer and the balance a rubbery copolymer comprising a monomer of an open-chain conjugated diene hydrocarbon having from 4 to 8 carbon atoms and a monomer selected from the group consisting of styrene and its alkyl and halogen substituted derivatives, said homopolymer having been substantially completely halogenated with and said copolymer having been from about 12.5 to 17.5% by weight halogenated with active halogen selected from the group consisting of chlorine and mixtures of chlorine and up to about 10% by weight of bromine and the active halogen atoms during the halogenation of said copolymer having been substantially evenly distributed throughout said copolymer by agitation of said copolymer in the presence of said active halogen, evaporating said solvent from said composition of said coating, applying a layer of a cement of a rubber composition in a volatile organic solvent and selected from the group consisting of natural rubber and butadiene-1,3-styrene copolymer rubber to said solvent-free adhesive coating, evaporating said solvent from said cement, associating a rubbery unvulcanized vulcanizable polymeric material in adhering relationship with said cement layer to produce a composite assembly and vulcanizing said assembly.

10. The method according to claim 9 in which said open-chain conjugated diene hydrocarbon in said copolymer of said adhesive composition is present in an amount of from about 55 to 85% by weight.

11. The method according to claim 10 in which said copolymer of said adhesive composition comprises a copolymer of about 75% by weight of butadiene-1,3 and the balance styrene.

12. The method according to claim 10 in which said rubbery unvulcanized vulcanizable polymeric material comprises natural rubber.

13. The method according to claim 10 in which said rubbery unvulcanized vulcanizable polymeric material comprises a rubbery copolymer of about 75% by weight of butadiene-1,3 and the balance styrene.

14. An article of manufacture according to claim 2 in which said homopolymer of said adhesive comprises a polymer of isoprene.

15. The method according to claim 9 in which said homopolymer of said adhesive composition comprises a polymer of isoprene.

16. The method according to claim 10 in which in said cement layer said rubbery composition comprises a copolymer of about 75% by weight of butadiene-1,3 and the balance styrene.

References Cited in the file of this patent
UNITED STATES PATENTS

| | | |
|---|---|---|
| 2,262,092 | Buffington | Nov. 11, 1941 |
| 2,352,705 | Garvey et al. | July 4, 1944 |
| 2,471,905 | Smith | May 31, 1949 |
| 2,581,920 | Kuhn | Jan. 8, 1952 |
| 2,775,537 | Wilson et al. | Dec. 25, 1956 |